Aug. 8, 1961  W. J. WILEY  2,995,110
POULTRY WATERING TROUGH
Filed Jan. 5, 1959  2 Sheets-Sheet 1
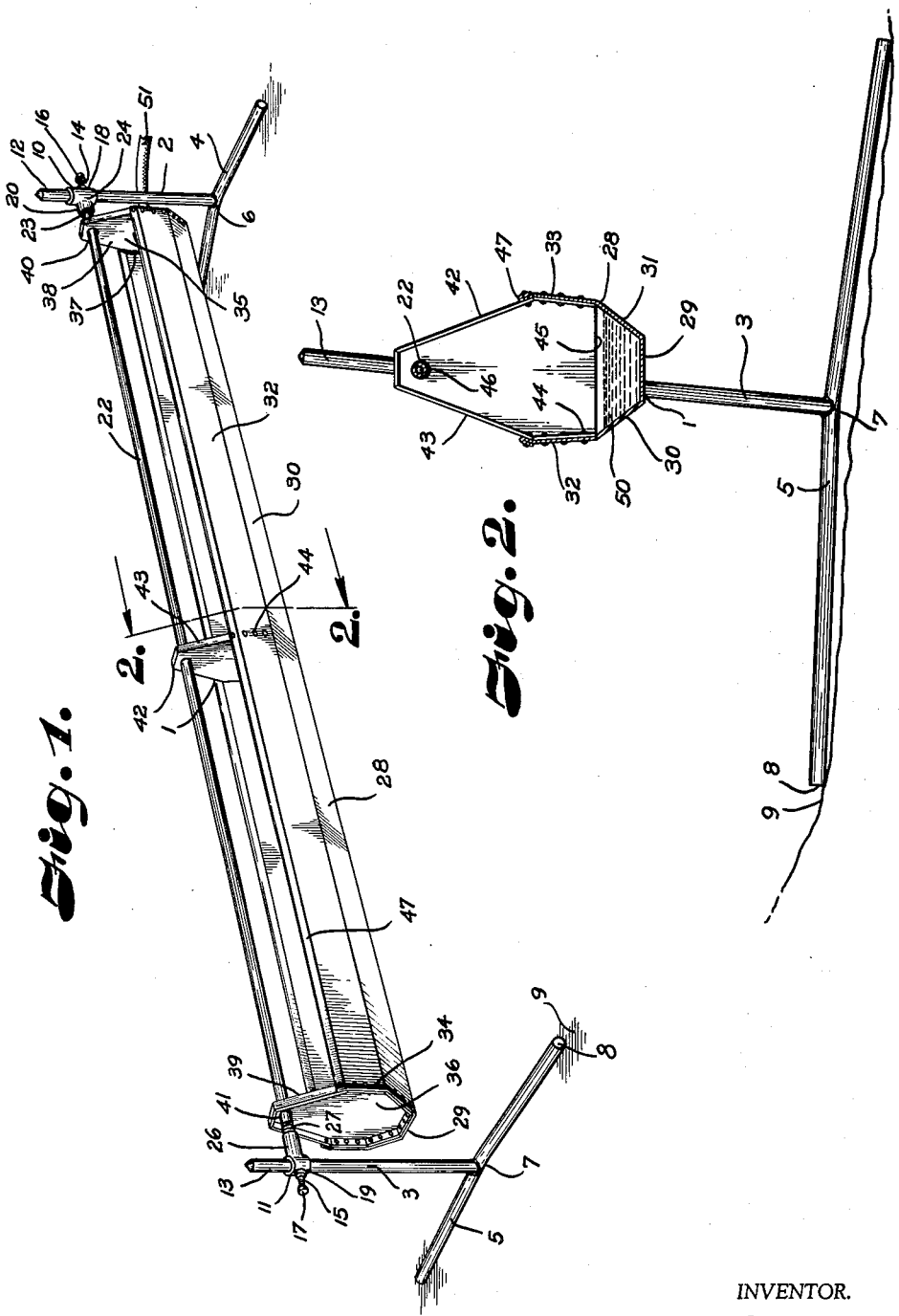
INVENTOR.
Woodrow J. Wiley.
BY
Fishburn & Gold
ATTORNEYS.

Aug. 8, 1961 W. J. WILEY 2,995,110
POULTRY WATERING TROUGH
Filed Jan. 5, 1959 2 Sheets-Sheet 2
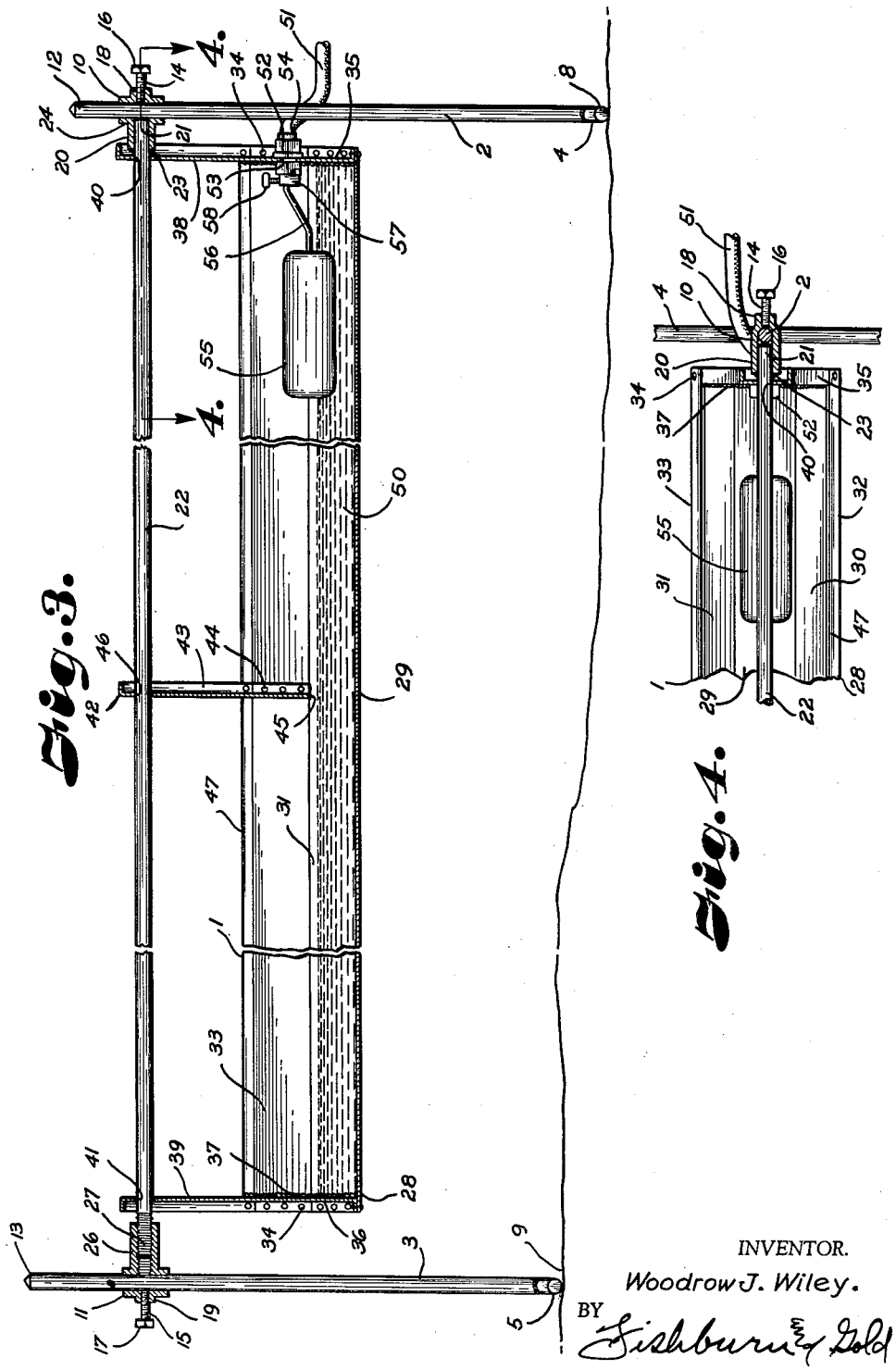
INVENTOR.
Woodrow J. Wiley.
BY
Fishburn & Gold
ATTORNEYS.

United States Patent Office 2,995,110
Patented Aug. 8, 1961

2,995,110
POULTRY WATERING TROUGH
Woodrow J. Wiley, Box 56, Crane, Mo.
Filed Jan. 5, 1959, Ser. No. 784,953
1 Claim. (Cl. 119—61)

This invention relates to poultry watering trough, and more particularly to a watering trough for poultry wherein the trough itself is self-leveling.

Heretofore various attempts have been made to devise a watering trough for poultry or animals and the like, which pivotally mount the trough on standards which will merely allow swinging of the trough manually, but it does not provide for self-leveling during use. Other attempts have been made to provide a self-cleaning watering or feeding trough for poultry and animals, but no one heretofore has devised a watering trough which included the self-leveling, self-supporting and easy cleaning device as now to be described.

The principal object of the present invention is to provide a device for watering poultry, mounted on standards having bases wherein one base may be engaged on uneven ground from the other base and the watering trough will automatically remain in level position.

Other objects of the present invention are to provide an elongated trough for containing the water supported from a horizontal rod between the standards; to provide the horizontal rod with one end thereof rotatably sleeved in a bearing slidable on one of the standards; to provide the other end of the horizontal rod with a sleeve adjustable vertically on the other standard; to provide the trough with end brackets and a center bracket having openings engaging over the horizontal rod to lend rigidity to the rod; to provide the center bracket spaced above the bottom of the trough to allow water to move from one end to the other of the trough; to provide means for supplying water to the trough; to provide a float valve in one end of the trough to automatically shut off the supply of water when the water reaches a predetermined level in the trough, and to provide a device of this character simple and economical to manufacture.

In accomplishing these and other objects of the invention I have provided improved details of structure, the preferred forms of which are shown in the accompanying drawings, wherein:

FIG. 1 is a perspective view of my watering trough embodying the features of my invention.

FIG. 2 is a cross-sectional view taken on a line 2—2, FIG. 1, illustrating one foot of a base at a higher elevation than the other base and the trough in a self-leveled position.

FIG. 3 is a cross-sectional view taken longitudinally through the device, particularly illustrating one of the foot or base members of the standards on a higher elevation of the ground than the other, and showing the trough in level position.

FIG. 4 is a cross-sectional fragmentary view taken on a line 4—4, FIG. 3.

Referring more in detail to the drawings:

1 designates a watering trough for poultry embodying the features of my invention comprising, spaced standards 2 and 3, mounted on bases or feet 4 and 5, curved upwardly at their centers as indicated at 6 and 7 so that the outer ends 8 of the feet will engage the ground or terrain as indicated at 9 (FIG. 3). The curved feature of the bases will tend to cause the outer ends to assume a greater affinity with the ground than if the bases are straight with less tendency to slide on the ground.

10 and 11 designate sleeve bearing members adapted to engage over the upper ends 12 and 13 of the standards 2 and 3 and are adjustable thereon by threaded shanks 14 and 15 of screws 16 and 17 engaging in threaded bosses 18 and 19 on the sleeve bearings 10 and 11 having their ends engaging the standards to hold the sleeves in adjusted position with respect to the ground for accommodating the fowl.

The bearing 10 is provided with an inwardly extending sleeve 20 in which one end 21 of a rod 22 is adapted to extend and is rigidly secured therein by welding or the like as indicated at 23. Other means may be utilized to rigidly secure the end of the rod 22 in the sleeve 20, for instance, the extreme end 21 may be welded or otherwise suitably secured directly to the side 24 of the sleeve 10.

The sleeve 11 on the standard 3 has internally threaded sleeve 26 adapted to receive the threaded end 27 of the rod 22. The threaded end 27 is loosely threaded in the threaded sleeve 26 so that the rod will readily and easily rotate therein, as will later be shown, and also hold the standards in spaced relation. This means of rotation of the rod is by way of illustration as other means of rotatably securing the rod in the sleeve may be utilized.

28 designates an elongated trough of sheet material, such as metal or the like, bent to substantially U-shape form having a flat bottom 29 and sides tapered outwardly as indicated at 30 and 31 and then bent upwardly as indicated at 32 and 33. Mounted in each end by rivets or the like 34 are end members 35 and 36 having outwardly turned flanges whereby the end members are secured to the inside of the trough by the rivets to form a rigid structure. The ends are made water-tight by welding on the inside thereof as indicated at 37 (FIG. 1). The end members have upwardly extending brackets 38 and 39 provided with openings 40 and 41 which are sleeved over the rod 22 to mount the trough on the rod.

Mounted substantially midway of the trough 28 is a bracket or supporting member 42 of sheet metal or the like having its edges turned laterally forming a flange 43 for rigidity of the bracket. The flange 43 is secured to the upwardly extending sides 32 and 33 of the trough 28 by rivets or the like 44, the lower end 45 of the bracket 42 being spaced from the bottom 29 of the trough, as best illustrated in FIG. 2. The sides of the bracket 42 are tapered inwardly and near the upper end thereof provided with an opening 46 for engaging over the rod 22. The upper edge of the trough is turned over and flattened, as indicated at 47, which adds strength to the trough itself.

I have found that the standard, bases and rod may be made from tubing and the troughs may be eight feet in length. With a structure of this length the rod sometimes sways or sags in the center, and I have found that, by providing the center bracket 42 with the opening for hanging the bracket on the rod which lies above the trough in a longitudinal median plane, the bracket not only adds strength to the trough but rigidity to both the trough and the rod.

In use of the device assembled as described, the sleeve bearings 10 and 11 may be adjusted vertically on the standards 2 and 3 for adjusting the height of the trough from the ground or floor in which it is to be used to suit poultry which are to be watered. The threaded end 27 of the rod 22 is freely rotatable in the threaded sleeve, thereby permitting the ends 4 and 5 of the bases to come in direct contact with the ground regardless of contour of the ground.

Water as indicated at 50 is supplied to the trough 29 through a hose or the like 51 from a source of supply (not shown). A cut-off valve 52 is mounted in an opening 53 in the end 35 of the trough, and the hose is secured thereto by connection 54. A float 55 is provided for engagement with the water and has a rod 56 engaging in a connection 57 in the valve 52 held therein by a thumbscrew 58. The rod is turned downwardly and offset from the float so that by turning of the rod the float will be raised and lowered in the water to adjust the level of the water in the trough. By tightening the thumbscrew 58 the rod 56 is held in the desired position in the connection 57.

It will be obvious from the foregoing that I have provided a trough with mounting of the horizontal rod, having one end in a sleeve bearing whereby the trough will automatically level itself should any end of the base be on uneven ground or higher or lower than the other base or ends of the bases; that the mounting of the brackets of the trough rotatably on the rod will further cause leveling of the water of the trough with respect to the standards should one end of each of the bases be higher than the other and the bracket in the center of the trough will support the rod upon which the trough is mounted to prevent sagging or swaying in the center thereof.

While I have here illustrated the framework structure to be of tubular material, any type of structure may be used without departing from the spirit of my invention. I have also shown the trough and bracket members to be of sheet metal, but other materials such as plastic or the like may also be utilized without departing from the spirit of my invention.

What I claim and desire to secure by Letters Patent is:

An adjustable poultry trough assembly comprising, a pair of spaced standards each having an elongate upright member with elongate foot members extending oppositely from the lower end thereof, said upright members each having a cylindrical portion along a length thereof, a sleeve slidable and rotatable on the cylindrical portion of each upright member for adjustment relative to said foot members, means engageable with said upright members for holding said sleeves fixed in adjusted position on the respective standards, said sleeves each having a bore opening toward the other, an elongate rod having ends extending into said bores whereby said rod is supported by said sleeves, said rod having one end rotatable in the bore of one sleeve, means retaining said one rod end in the respective bore, the other end of said rod being secured to the other sleeve, an open top trough adapted to contain materials for poultry, said trough having an elongate bottom wall and upwardly and outwardly inclined side walls, said side walls terminating in upper edges extending longitudinally of said trough, end walls secured to said bottom and side walls, and a partition spaced from said end walls and arranged transversely of said trough, said partition being fixed to said side walls with a lower edge space above said bottom wall, said end walls and partition having portions extending upwardly above the upper edges of said side walls and having aligned bearing openings therein through which said elongate rod extends for swingingly mounting said trough between said standards, said rod being spaced from and above the upper edges of said side walls sufficiently to define elongate pick openings therebetween to provide poultry access to material in the trough and prevent poultry from sitting on said trough side edges.

References Cited in the file of this patent

UNITED STATES PATENTS

| | | |
|---|---|---|
| 1,216,203 | Bower | Feb. 13, 1917 |
| 1,227,323 | Russell | May 22, 1917 |
| 2,738,766 | Hart | Mar. 20, 1956 |
| 2,771,058 | Howard | Nov. 20, 1956 |
| 2,786,447 | Murray | Mar. 26, 1957 |
| 2,801,610 | Wallace et al. | Aug. 6, 1957 |
| 2,825,303 | Ashby | Mar. 4, 1958 |